United States Patent [19]

Kitabayashi et al.

[11] Patent Number: 4,503,377
[45] Date of Patent: Mar. 5, 1985

[54] VARIABLE SPEED ROTARY ELECTRIC MACHINE

[75] Inventors: Yukio Kitabayashi; Noriyoshi Takahashi; Masatoshi Watanabe, all of Hitachi; Toshiaki Okuyama, Ibaraki; Yoji Tanaka, Hitachi, all of Japan

[73] Assignee: Hitachi, Ltd., Tokyo, Japan

[21] Appl. No.: 568,264

[22] Filed: Jan. 4, 1984

[30] Foreign Application Priority Data

Jan. 14, 1983 [JP] Japan .................................. 58-3436

[51] Int. Cl.³ .............................................. H02P 5/34
[52] U.S. Cl. ...................................... 318/807; 318/730;
318/827; 318/832; 310/112; 310/166
[58] Field of Search ............... 318/730, 807, 827, 832;
310/115, 112, 166

[56] References Cited

U.S. PATENT DOCUMENTS

| 1,617,394 | 2/1927 | Japolsky et al. | 318/807 X |
|---|---|---|---|
| 2,280,456 | 4/1942 | Stevens et al. | 318/807 X |
| 2,573,283 | 10/1951 | Seitz | 318/832 |
| 2,808,552 | 10/1957 | Voege | 310/212 X |
| 2,845,588 | 7/1958 | Sampietro | 318/807 |
| 2,896,143 | 7/1959 | Bekey | 310/115 X |
| 4,039,910 | 8/1977 | Chirgwin | 318/807 |
| 4,143,309 | 3/1979 | Patterson | 318/807 |

Primary Examiner—Donovan F. Duggan
Attorney, Agent, or Firm—Antonelli, Terry & Wands

[57] ABSTRACT

A variable speed rotary electric machine comprises a stator composed of a stator core and first and second stator windings wound on the stator core, and a cage rotor mounted rotatably within the stator and composed of a rotor core and rotor conductor disposed in a squirrel-cage configuration. The first stator winding is connected to an AC power supply of a fixed frequency. The second stator winding is connected to a power supply of a variable frequency. The first and second stator windings are so wound as to form, respectively, numbers of poles differing from each other. The rotor conductors of the cage rotor are electromagnetically coupled with the magnetic flux generated by the first and second stator windings, respectively, and so disposed as to form a number of poles which is intermediate between the number of the poles formed by the first stator winding and the number of poles formed by said second stator winding.

7 Claims, 15 Drawing Figures

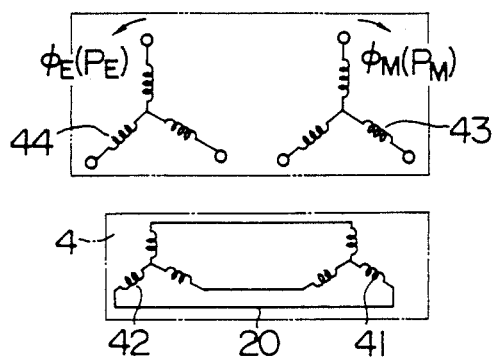
FIG. 9a
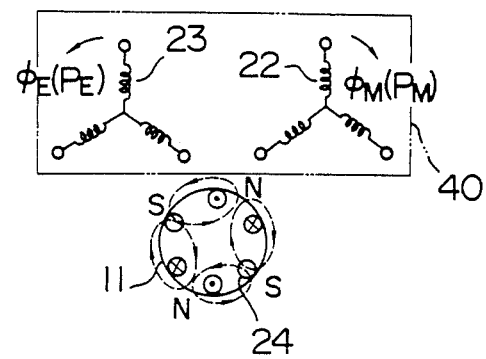
FIG. 9b
FIG. 10a
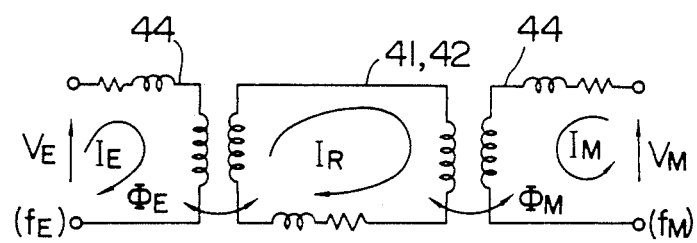
FIG. 10b
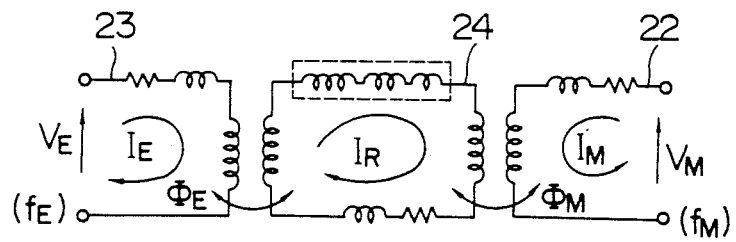

VARIABLE SPEED ROTARY ELECTRIC MACHINE

The present invention generally relates to an improvement of a variable speed rotary electric machine and more particularly, an improvement of a variable speed induction rotary machine such as a variable speed induction motor, or generator, using variable frequency control.

In recent years, as progress is made in the technology of variable frequency devices, the induction motors and induction generators of relatively high stoutness attract increasingly attention as the variable speed rotary electric machines.

In particular, the induction generators are used in place of synchronous generators employed heretofore as hydraulic turbine generators. Since the induction generator can generate electric power at a constant frequency independent of variations in the rotating speed thereof by excitation of variable frequency, it is possible to operate the hydraulic turbine at the most efficient rotating speed depending on its variable load. By way of example, when variation in the flow rate of water or in the load occurs in a hydraulic power plant where the synchronous generator is employed, the flow rate of water supplied to the hydraulic turbine sometimes referred to as a water wheel is so adjusted by means of a governor and/or a water flow regulating valve that the synchronous generator be constantly, driven at a predetermined number of rotations to thereby output the electric power at a predetermined constant frequency. However, operation of the hydraulic turbine at the constant speed through regulation of the flow rate of water supply thereto incurs undesirably degradation in the efficiency of the hydraulic turbine. In contrast, in case the variable speed induction generator mentioned above is employed, a constant frequency can be assured independent of the rotating speed, which means that the hydraulic turbine can always be driven at its most efficient rotating speed. Furthermore, the use of the variable speed induction generator renders it unnecessary to employ the heretofore required governor of expensive and complicated structure, to a great advantage.

The prior art and the present invention will be explained in conjunction with the accompanying drawings, in which:

FIGS. 5 to 7 are views for illustrating the principle of the invention, in which FIG. 5 shows a coordinate system for illustrating the theoretical analysis, FIG. 6 is a schematic front view showing disposition of rotor bars, and FIG. 7 is a developed view of the same;

FIGS. 9a and 9b and FIGS. 10a and 10b are views for illustrating structure and the principle of operation of the generator-motor system according to the invention by comparing with the hitherto known system.

Figure 1:
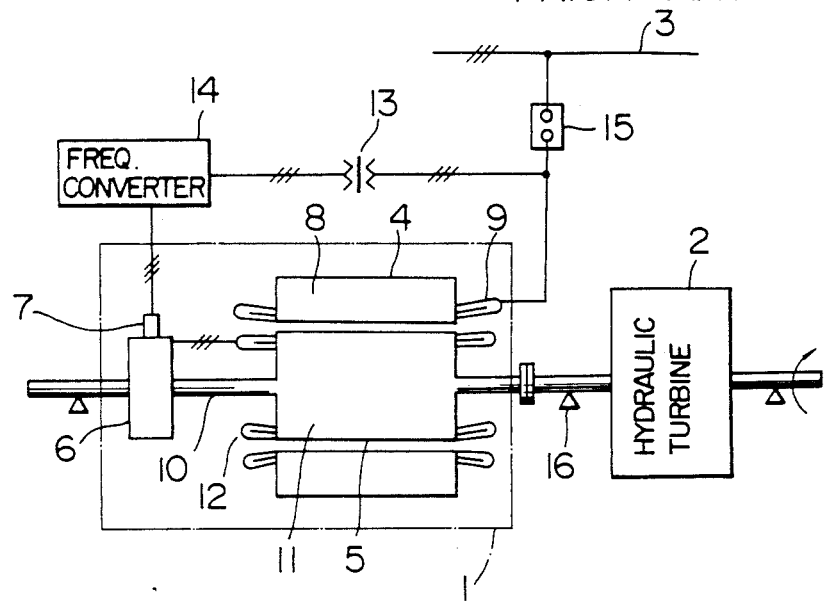
FIGS. 1 and 2 are schematic views showing hitherto known variable speed generator-motor systems, respectively.

A power system in which the above-mentioned advantageous variable speed induction rotary machine is employed has been proposed, for example, in Japanese Patent Application Laid-Open No. 45022/1977 in which a woundrotor induction generator is used as a generator whose secondary winding (rotor winding) is excited by an AC exciting current supplied from a variable-frequency AC source which is adjusted at a frequency corresponding to the rotating speed of the hydraulic turbine. With such arrangement, it is possible to generate an electric energy at a constant frequency even when rotating speed of the hydraulic turbine changes. Describing in some detail this known wound-rotor induction generator and the associated control system by referring to FIG. 1 which shows a basic system structure thereof, the wound-rotor induction generator 1 is driven by a hydraulic turbine 2 to generate electric energy which is supplied to a system bus 3.

The wound-rotor induction generator itself is composed of a stator 4 of an annular configuration, a rotor 5 rotatably mounted within the stator 4, and a current collector including a slip ring 6 and brushes 7 and mounted at an end of the rotor for supplying it with an exciting current.

The annular stator 4 includes a stator core 8 having winding slots formed in the inner peripheral surface thereof and a primary winding 9 wound on the stator core as received within the grooves. On the other hand, the rotor 5 includes a rotatable shaft 10, a rotor core 11 mounted on the shaft 10 for rotation integrally with it and having winding slots formed in the outer peripheral surface, and a secondary winding 12 wound on the rotor core as received within the slots thereof.

Arrangement is made such that the secondary winding 12 is supplied with a part of the output power derived from the primary winding 9 by way of a transformer 13 and a frequency converter 14. In FIG. 1, numeral 15 denotes a switch interposed between the generator and the system bus 3, and 16 denotes bearings for supporting the shaft of the rotor 5.

In the system of the arrangement described above in conjunction with FIG. 1, the output frequency of the primary winding is controlled to be held at a predetermined constant value (commercial frequency) $f_1$ with a given number of rotation $N_R$ (rpm) of the hydraulic turbine in a manner as mentioned below. Since the frequency $f_2$ of the secondary winding is equal to difference between the output frequency $f_1$ of the primary winding and the rotational frequency of the rotor, the following relationship applies:

$$f_2 = f_1 - \frac{N_R}{60} \cdot \frac{P}{2} \quad (1)$$

where P represents the number of poles in the induction machine. Accordingly, the frequency is controlled by detecting the rotational frequency $N_R$ by means of an existing rotational number detector and exciting the secondary winding 12 with an alternating current of the frequency $f_2$ determined from the above expression (1). In this way, the output frequency can be maintained at a constant value with any given rotational speed. However, the control system according to the prior application suffers from shortcomings described below. One of them can be seen in the fact that the current collector composed of the slip ring 6 and the brushes 7 has to be indispensably provided which requires troublesome maintenance from time to time and undergoes abrasion to shorten the use life. Another drawback is seen in that end portions of the rotor winding are subjected to enormously large stress under a centrifugal force and an electromagnetic force produced upon accidental failure (e.g. occurrence of short circuit), giving rise to a problem with regard to the mechanical strength. In a certain case, there may arise in reality damage and eventual destruction of the winding, leading to occurrence of a serious accident.

There is known a rotary machine of the type under consideration which is relatively less susceptible to the drawbacks mentioned above. For example, reference may be made to Japanese Patent Publication No. 21959/1982. More particularly, referring to FIG. 2 of the accompanying drawings, this known system includes a pair of induction machines 17 and 18 which are mechanically coupled together by means of a coupling 19, wherein a secondary winding (rotor winding) 41 of the first induction machine 17 is electrically connected to a secondary winding 42 of the second induction machine through a connector 20. Since the primary winding (stator winding) of the first induction machine 17 is directly connected to an AC bus 3, it is referred to as the main machine while the second induction machine 18 having a primary winding 44 is termed an exciter.

Operation of this system is as follows. Assuming that the primary frequency of the main machine 17 is represented by $f_{M1}$ with the secondary frequency thereof being represented by $f_{M2}$, while the primary frequency of the exciter 18 is represented by $f_{E1}$ with the secondary frequency thereof being represented by $f_{E2}$, and that slips in the main machine and the exciter are represented by $S_M$ and $S_E$, respectively, the following relations apply:

$$f_{M2} = S_M f_{M1} = f_{M1} - \frac{N_R}{120} P_M \quad (2)$$

$$f_{E2} = f_{M2} \quad (3)$$

$$f_{E1} = \frac{1}{S_E} f_{E2} = \frac{S_M}{S_E} f_{M1} = f_{M1} - \frac{N_R}{120} (P_M + P_E) \quad (4)$$

where $N_R$ is the number of revolutions of the hydraulic turbine, $P_M$ is the number of poles in the main machine and $P_E$ is the number of poles in the exciter.

As will be apparent, the primary frequency $f_{M1}$ (i.e. frequency of the AC current obtained from the primary winding) of the main machine can be maintained at a predetermined constant value (e.g. commercial frequency) by supplying a current of the frequency $f_{E1}$ which is determined on the basis of the detected revolution number $N_R$ in accordance with the expression (4) to the primary winding of the exciter through a frequency converter 14, even when the number of revolutions of the hydraulic turbine undergoes any variation. With this arrangement, the so-called brushless structure in which the provision of the current collector is unnecessary can be realized, whereby the problem of the troublesome maintenance can be solved, bringing about an advantage in this respect. However, this arrangement is accompanied with a disadvantage in that two induction machines are required, involving increased size and cost of the system. As an attempt to deal with this problem, it is conceivable to mount two sets of rotor windings on a single rotor in a duplex winding structure with an iron core being used in common so that a pair of induction machines may be considered to be implemented in a single integral unit. However, the structure of the rotor windings will then become much complicated, involving a problem in the manufacture in practice. Furthermore, great difficulty will be encountered in supporting the end portions of the rotor windings, resulting in that the adequate mechanical rigidity or strength can not be assured.

For reinforcing the mechanical strength, it might be considered to replace the rotor of the wound-rotor structure by a cage or squirrel-cage rotor. As is well known, the cage rotor is characteristic of a much simplified and rigid structure of the winding end portion in which an end ring is simply bonded to the rotor conductors or bars.

However, in case the conventional cage rotor is combined with the stator of the structure described hereinbefore, i.e. the stator provided with the duplicated or double windings which are supplied with currents of mutually different frequencies, respectively, it is impossible to control one of the stator winding currents by the other depending on the revolving speed, unlike the case of the aforementioned wound-rotor induction generator, because excitation is effected at either one of the frequencies even if the current of a variable frequency is supplied to one of the windings. Thus, the combination can operate as a usual generator, but not as a variable-speed generator with a constant output frequency.

In view of the foregoing, it is an object of the present invention to provide a variable speed rotary electric machine which is substantially immune to the drawbacks of the hitherto known machines described above and in which one of the stator winding currents can be controlled by the other in accordance with the revolving speed even when the rotor is realized in a squirrel-cage structure.

According to the present invention, there is provided a variable speed rotary electric machine which includes a stator composed of a stator core provided with first and second stator windings and a squirrel-cage rotor, wherein the first stator winding is connected to an AC power supply source of a constant frequency while the second stator winding is connected to an AC power supply source of a variable frequency. The first and second stator windings are so wound as to form different numbers of poles, respectively. On the other hand, the squirrel-cage rotor is provided with conductor bars whose number is adapted to form an intermediate number of poles between the number of poles formed by the first stator winding and that of the second stator winding.

Figure 3:
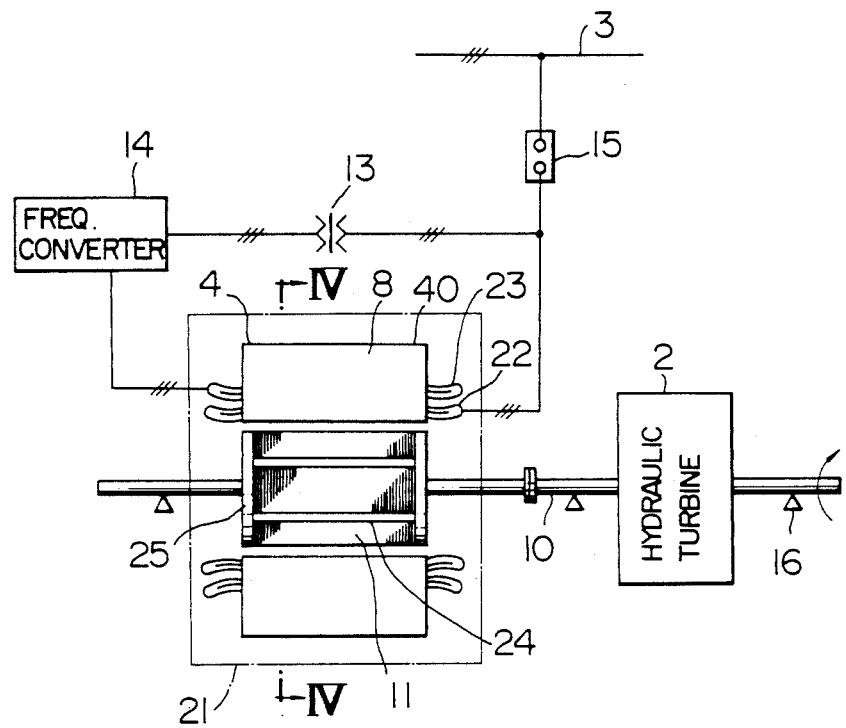
FIG. 3 is a schematic view illustrating a general arrangement of a brushless variable-speed generator-motor system according to an embodiment of the present invention.
Figure 4:
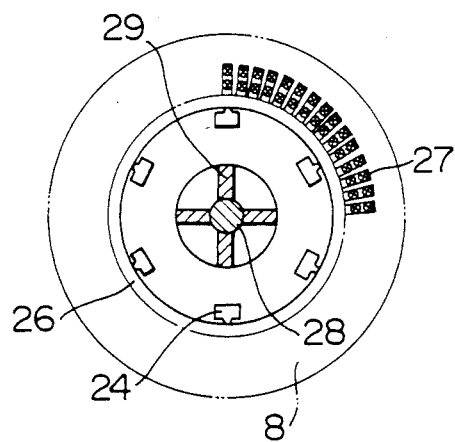
FIG. 4 shows a sectional view taken along the line IV—IV in FIG. 3.

In the following, the invention will be described in detail in connection with an exemplary embodiment thereof by referring to FIGS. 3 and 4. FIG. 3 is a schematic view showing a variable speed rotary electric machine, more particularly a variable speed generator-motor system according to an embodiment of the invention. In FIG. 3, the same parts as those shown in FIG. 1 are denoted by like reference numerals. Referring to FIG. 3, the rotary induction machine shown as enclosed by a single-dotted line block 21 includes a stator 40 having a stator core 8 wound with duplicate or double windings for generating two revolving magnetic fields which differ from each other in the number of poles, and a cage rotor provided with rotor bars whose number is selected to have a specific relation to the numbers of poles of the respective stator windings according to the invention. In FIG. 3, reference numerals 22 and 23 denote, respectively, first and second primary windings of the stator. In the following description, the winding 22 will be referred to as a main winding while the winding 23 will be termed an exciting winding. A reference numeral 24 denotes the rotor bars, and 25 denotes end rings serving for electrically connecting the rotor bars at both ends of the rotor, respectively. It should be noted that in the case of this embodiment, the rotor bars 24 are provided in a number which lies between the numbers of poles formed by the stator windings 22 and 23, respectively. In the case of the embodiment of the invention shown in FIG. 4, it is assumed that the primary winding forms eight poles, the exciting winding has four poles and that the number of the rotor bars is selected equal to six. A reference numeral 26 denotes an air gap between the stator and the rotor, 27 denotes slots formed in the stator core, 28 denotes a rotatable shaft and 29 denotes a spider.

Next, the principle of operation of the variable speed generator-motor system according to the illustrated embodiment of the invention will be described.

Figure 5:
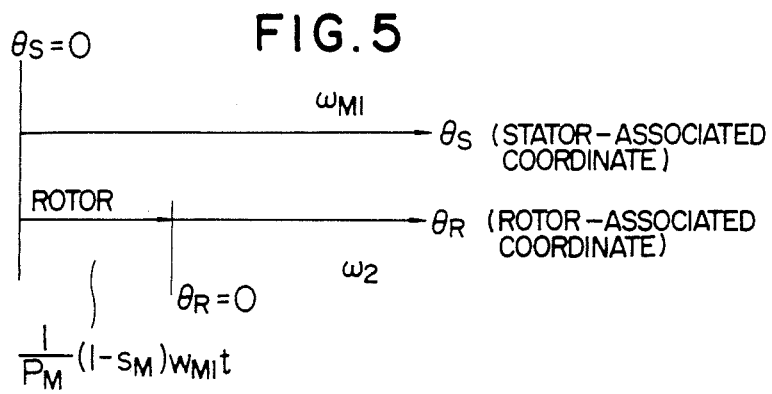
Figure 6:
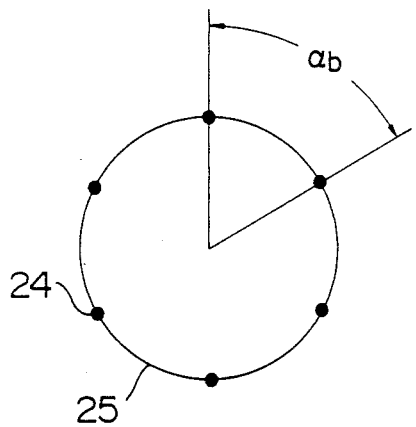
Figure 7:
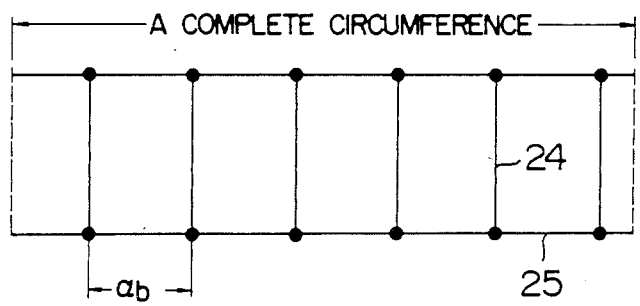

In the first place, the reason for which the system can operate as a variable speed system when the above mentioned relationship is established between the numbers of stator poles and the number of the rotor bars will be elucidated. FIG. 5 shows a coordinate system used for the theoretical analysis to be discussed hereinafter, in which the coordinate associated with or fixed on the stator is represented by $\theta_S$ while the coordinate associated with or fixed on the rotor is represented by $\theta_R$ which is displaced in phase by $$\frac{1}{P_M}(1 - S_M)\omega_{M1}t$$

from the coordinate $\theta_S$. These coordinates are shown in the state developed in the circumferential direction, wherein $\theta_S$ thus indicates a value of spatial displacement from a predetermined origin on the stator. On the other hand, $\theta_R$ indicates a spatial displacement of the rotor in the rotation thereof from the original set at a point on the rotor surface which corresponds to $\theta_S$ of zero (i.e. the original of the stator-associated coordinate system). Further, $\omega_{M1}$ represents an angular frequency of the main winding current of the stator, $\omega_{E1}$ represents an angular frequency of the exciting winding current of the stator, and $\omega_2$ represents an angular frequency of the current of the rotor conductors (bars). Disposition of the end ring and the rotor bars is schematically illustrated in FIGS. 6 and 7, wherein the rotor bar array shown in FIG. 6 is illustrated in FIG. 7 in the state developed in the circumferential direction. Referring to these figures, when the number of the bars is represented by N with a bar pitch being represented by $a_b$, the following relation applies:

$$N \cdot a_b = 2\pi \quad (5)$$

In the stator-associated coordinate system, the voltage $V_M$ of the main winding and the voltage $V_E$ of the exciting winding for u-, v- and w-phases, respectively, can be given by the following expressions (6) and (7), respectively.

$$\left. \begin{array}{l} V_{Mu} = \sqrt{2}\, V_M e^{j\omega_{M1}t} \\ V_{Mv} = \sqrt{2}\, V_M e^{j(\omega_{M1}t - \frac{2}{3}\pi)} \\ V_{Mw} = \sqrt{2}\, V_M e^{j(\omega_{M1}t - \frac{3}{4}\pi)} \end{array} \right\} \quad (6)$$

$$\left. \begin{array}{l} V_{Eu} = \sqrt{2}\, V_E e^{j\omega_{E1}t} \\ V_{Ev} = \sqrt{2}\, V_E e^{j(\omega_{E1}t + \frac{2}{3}\pi)} \\ V_{Ew} = \sqrt{2}\, V_E e^{j(\omega_{E1}t + \frac{3}{4}\pi)} \end{array} \right\} \quad (7)$$

Both the expressions (6) and (7) represent the three-phase balanced voltages. It is noted that the exciting winding is connected in the negative phase sequence relative to the primary winding. Further, the primary winding current $i_M$ and the exciting winding current $i_E$ (of the stator) for u-, v- and w-phases, respectively, are given by the following expressions (8) and (9), respectively.

$$\left. \begin{array}{l} i_{Mu} = \sqrt{2}\, I_M e^{j\omega_{M1}t} \\ i_{Mv} = \sqrt{2}\, I_M e^{j(\omega_{M1}t - \frac{2}{3}\pi)} \\ i_{Mw} = \sqrt{2}\, I_M e^{j(\omega_{M1}t - \frac{4}{3}\pi)} \end{array} \right\} \quad (8)$$

$$\left. \begin{array}{l} i_{Eu} = \sqrt{2}\, I_E e^{j\omega_{E1}t} \\ i_{Ev} = \sqrt{2}\, I_E e^{j(\omega_{E1}t + \frac{2}{3}\pi)} \\ i_{Ew} = \sqrt{2}\, I_E e^{j(\omega_{E1}t + \frac{4}{3}\pi)} \end{array} \right\} \quad (9)$$

Both expressions 8 and 9 represent the three-phase balanced currents. By the way, description about the exciting current for generating the exciting magnetic flux is not important for elucidation of the operation under consideration and thus omitted.

Next, a magnetomotive force generated under the applied voltages is determined. More specifically, a composite magnetomotive force of the stator and the rotor is expressed as follows:

$$\begin{array}{ll} a_t = & AT_M e^{j(\omega_2 t - pM\theta_R)} \quad \text{(1st term)} \\ & + AT_E e^{j(\omega_2 t \mp pE\theta_R)} \quad \text{(2nd term)} \\ & + AT_2(o) e^{j\omega_2 t} \quad \text{(3rd term)} \\ & + \sum_{m=1}^{\infty} AT_{2f}(m) e^{j(\omega_2 t - m\theta_R)} \quad \text{(4th term)} \\ & + \sum_{m=1}^{\infty} AT_{2b}(m) e^{j(\omega_2 t + \theta_R)} \quad \text{(5th term)} \end{array} \quad (10)$$

where $$AT_2(o) = -\sqrt{2}\, \frac{a_b}{2\pi} \sum_{n=1}^{N} n I_b(n) \quad (11)$$

$$AT_{2f}(m) = -\sqrt{2}\, \frac{1}{2j}\, \frac{1}{\pi m} \sum_{n=1}^{N} I_b(n) e^{jm\theta R(n)} \quad (12)$$

$$AT_{2b}(m) = \sqrt{2}\, \frac{1}{2j}\, \frac{1}{\pi m} \sum_{n=1}^{N} I_b(n) e^{-j\theta R(n)} \quad (13)$$

$$\theta_R(n) = (n - 1)\alpha_b \quad (14)$$

$$I_b(n) = I_{bM}(p_M)e^{-jp_M\theta_R(n)} \quad \text{(1st term)} \quad (15)$$

$$+ I_{bE\mp}(p_E)e^{-p_E\theta_R(n)} \quad \text{(2nd term)}$$

$$+ \sum_{l=1}^{\infty} I_{b2}(l)e^{-jl\theta_R(n)} \quad \text{(3rd term)}$$

$$+ \sum_{l=1}^{\infty} I_{b2b}(l)e^{jl\theta_R(n)} \quad \text{(4th term)}$$

where $p_M$: number of pole pairs in the main winding,
$P_E$: number of pole pairs in the exciter, and
m: m-th harmonic wave.

In the above expression (10), the first term represents the magnetomotive force of the stator produced by the main winding and the second term represents the magnetomotive force of the stator produced by the exciting winding. The third to fifth terms represent the magnetomotive force of the rotor bars, wherein the third term represents a unipolar component, i.e. a magnetomotive force of axial direction, the fourth term represents a positive-phase-sequence component, and the fifth term represents a negative-phase-sequence component. The magnetomotive force of the rotor bars contains harmonic components whose values vary in dependence on the number of the bars. Amplitudes of the components represented by the third to fifth terms are given by the expressions (11) to (13), respectively. The expression (14) gives a bar current at the n-th bar. The current flowing through the bars contains components relating to the number of poles of the main winding and the number of poles in the exciting winding and other harmonic components in various combinations.

By the way, to meet the requirement for continuity of the current through the rotor bars, the following condition must be satisfied:

$$\sum_{n=1}^{N} I_b(n) = 0 \quad (16)$$

Accordingly, the unipolar component given by the expression (11) and hence the third term of the expression (10) are zero.

In view of the expression (16), the expressions (12) and (13) may be rewritten in the orderly forms as follows:

$$AT_{2f}(m) = -\sqrt{2} \frac{1}{2j} \frac{1}{\pi m} \left[ I_{bM}(p_M) \sum_{n=1}^{N} e^{j(m-p_M)\theta_R(n)} \right. \quad (17)$$

$$+ I_{bE\mp}(p_E) \sum_{n=1}^{N} e^{j(m\mp p_E)\theta_R(n)}$$

$$+ \sum_{l=1}^{\infty} I_{b2}(l) \sum_{n=1}^{N} e^{j(m-l)\theta_R(n)}$$

$$\left. + \sum_{l=1}^{\infty} I_{b2b}(l) \sum_{n=1}^{N} e^{j(m+l)\theta_R(n)} \right]$$

and $$AT_{2b}(m) = \sqrt{2} \frac{1}{2j} \frac{1}{\pi m} \left[ I_{bM}(p_M) \sum_{n=1}^{N} e^{-j(m+p_M)\theta_R(n)} \right. \quad (18)$$

$$+ I_{bE\mp}(p_E) \sum_{n=1}^{N} e^{-j(m\pm p_E)\theta_R(n)}$$

$$+ \sum_{l=1}^{\infty} I_{b2}(l) \sum_{n=1}^{N} e^{-j(m+l)\theta_R(n)}$$

$$\left. + \sum_{l=1}^{\infty} I_{b2b}(l) \sum_{n=1}^{N} e^{-j(m-l)\theta_R(n)} \right]$$

By replacing the expressions (5) and (14) in the expressions (17) and (18), the latter can be rewritten in the orderly forms as follows:

$$AT_{2f}(m) = \quad (19)$$

$$-\sqrt{2} \frac{1}{2j} \frac{1}{\pi m} \left[ I_{bM}(p_M) \left\{ \frac{1 - e^{j2(m-p_M)\pi}}{1 - e^{j\frac{(m-p_M)}{N}2\pi}} \right\} + \right.$$

$$I_{bE\mp}(p_E) \left\{ \frac{1 - e^{j2(m\mp p_E)\pi}}{1 - e^{j\frac{(m\mp p_E)}{N}2\pi}} \right\} +$$

$$\sum_{l=1}^{\infty} I_{b2}(l) \left\{ \frac{1 - e^{j2(m-l)\pi}}{1 - e^{j\frac{(m-l)}{N}2\pi}} \right\} +$$

$$\left. \sum_{l=1}^{\infty} I_{b2b}(l) \left\{ \frac{1 - e^{j2(m+l)\pi}}{1 - e^{j\frac{(m+l)}{N}2\pi}} \right\} \right]$$

and $$AT_{2b}(m) = \quad (20)$$

$$\sqrt{2} \frac{1}{2j} \frac{1}{\pi m} \left[ I_{bM}(p_M) \left\{ \frac{1 - e^{-j2(m+p_M)\pi}}{1 - e^{-j\frac{(m+p_M)}{N}2\pi}} \right\} + \right.$$

$$I_{bE\mp}(p_E) \left\{ \frac{1 - e^{-j2(m\pm p_E)\pi}}{1 - e^{-j\frac{(m\pm p_E)}{N}2\pi}} \right\} +$$

$$\sum_{l=1}^{\infty} I_{b2}(l) \left\{ \frac{1 - e^{-j2(m+l)\pi}}{1 - e^{-j\frac{(m+l)}{N}2\pi}} \right\} +$$

$$\left. \sum_{l=1}^{\infty} I_{b2b}(l) \left\{ \frac{1 - e^{-j2(m-l)\pi}}{1 - e^{-j\frac{(m-l)}{N}2\pi}} \right\} \right]$$

Figure 8A:
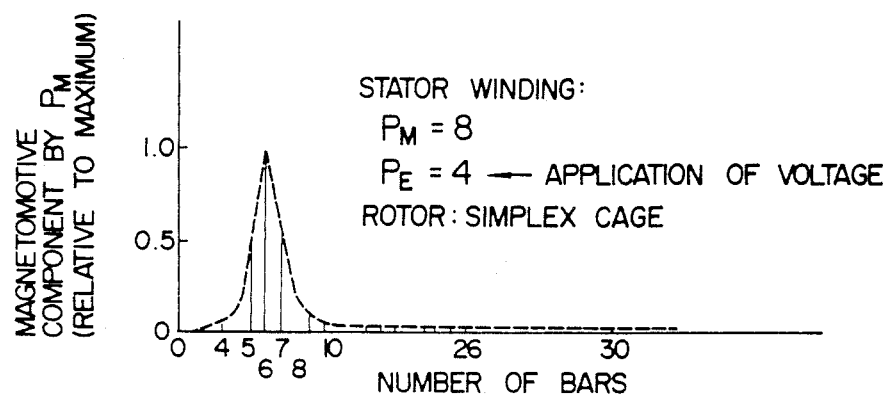
FIGS. 8a to 8c are characteristic views for illustrating relationships between the number of rotor bars and a magnetomotive force component.
Figure 8B:
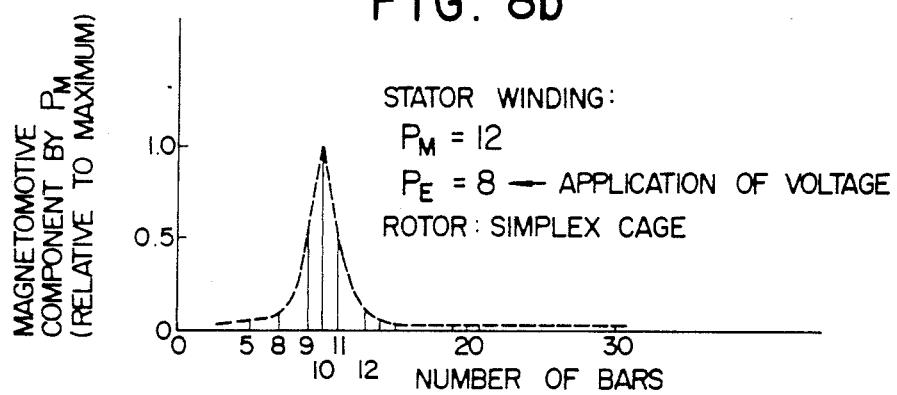
Figure 8C:
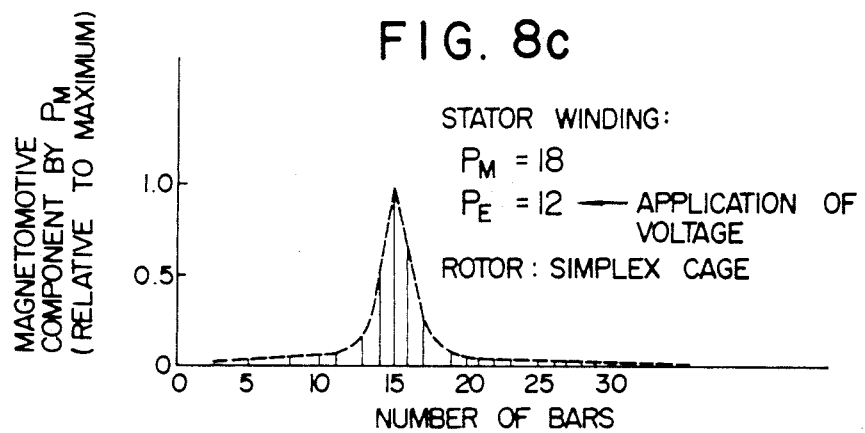

Next, examination will be made on the magnitude of the harmonic components which are induced in the main winding constituting one of the stator windings when a voltage is applied to the exciting winding constituting the other of the stator windings in compliance with the expressions (19) and (20) during rotation of the cage rotor of simplex winding. It is known that when the winding factor of the stator is 1.0 and the rotor is a so-called solid rotor in which the whole surface is covered by conductors, only the magnetomotive force corresponding to the revolving magnetic field produced by the stator is generated. However, in view of the fact that the solid rotor is subjected to a significant eddy current loss, it is common in practice to use the cage rotor provided with conductor bars disposed in the slots. Since the number of the conductor bars of the cage rotor is limited, the gap magnetomotive force includes a large number of harmonic components. FIGS. 8a to 8c illustrate the relationships between the number of the rotor bars and harmonic components produced by the stator winding and contained in the gap magnetomotive force on the assumption that the stator is of a duplex winding type and that the rotor is of a simplex cage winding type. The relation illustrated in FIG. 8a corresponds to the case where the pole number $P_M$ of the main winding is equal to eight and the pole number $P_E$ of the exciting winding is four. The relation illustrated in FIG. 8b corresponds to the case where the pole number $P_M$ is 12 and $P_E$ is 8. The relation illustrated in FIG. 8c is based on the conditions that $P_M = 18$ and that $P_E = 12$. It will be seen from the figures that the harmonic component generated by the main winding of poles in number $P_M$ is of such magnitude which can be controlled from the side of the stator, for example, by controlling the frequency, voltage and/or phase of the excitation, provided that the number of the rotor bars lies between the pole numbers $P_M$ and $P_E$ of the stator. In this connection, it goes without saying that the magnetomotive force corresponding to the pole number $P_E$ of the exciting winding is generated regardless of the number of the rotor bars since the voltage is applied to the exciting winding. It will further be seen that in case the number of the rotor bars is not in the range between the pole numbers $P_M$ and $P_E$, e.g. when the number of rotor bars is 22, 36 or 44 as is usually the case of the cage rotor, the magnetomotive component $P_M$ due to the main winding of the stator is scarcely generated.

Figure 2:
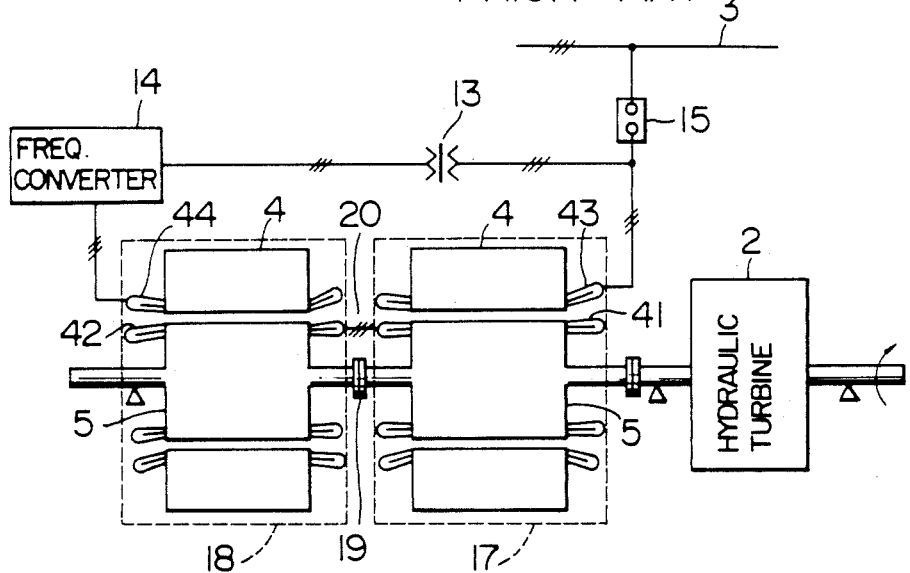

In order to assure the operation similar to that of the hitherto known brushless wound-rotor induction machine shown in FIG. 2, the magnetomotive components corresponding to the pole number $P_M$ of the main winding and the pole number $P_E$ of the exciting winding must necessarily be produced in the gap. This requirement can be fully satisfied when the number of the rotor bars lies between the pole numbers $P_E$ and $P_M$.

Next, the principle of operation of the brushless squirrel-cage induction machine according to the invention will be elucidated in comparison with the hitherto known brushless wound-rotor type induction machine by referring to FIGS. 9a and 9b and FIGS. 10a and 10b. As will be seen in FIGS. 9a and 9b, the primary circuit (stator circuit) is of identical configuration in both the woundrotor induction machine (FIG. 9a) and the squirrel-cage induction machine (FIG. 9b). Concerning the secondary circuit (rotor circuit), the three-phase balanced windings are connected in the negative phase sequence in the case of the wound-rotor induction machine (FIG. 9a). The current flowing through the primary exciting winding generates the revolving magnetic field having the pole number $P_E$. When the secondary winding 42 of the pole number $P_E$ is intersected by the revolving magnetic field, a current flow is induced in the secondary winding 42. Since the secondary winding 42 of the pole number $P_E$ is electrically connected to the secondary winding 41 of the pole number $P_M$, the current flows naturally to the secondary winding 41 as well. Consequently, the rotor produces two magnetic fields of the pole numbers $P_E$ and $P_M$, respectively, in the course of rotation thereof, even though the current flowing through the windings is of a single frequency. The revolving magnetic field of the pole number $P_M$ generated by the rotor intersects the primary main winding 43 of the pole number $P_M$ to induce a current of the frequency corresponding to the pole number $P_M$ in the primary main winding. In this way, the machine operates as the generator.

On the other hand, in the case of the squirrelcage induction machine shown in FIG. 9b, the rotor is of a simplex end-ring structure in which the bars are connected through a single end-ring and has rotor bars whose number is intermediate between the pole number $P_E$ of the exciting winding and the pole number $P_M$ of the main winding. As will be seen from FIGS. 8a to 8c, since the gap magnetomotive force contains the components corresponding to the pole numbers $P_E$ and $P_M$ and having fully controllable magnitude, there takes place a phenomenon similar to the case in which the rotor of the wound-rotor type forms two magnetic fields of the pole numbers $P_E$ and $P_M$, respectively in the course of rotation. However, since the squirrel-cage rotor is provided with a reduced number of the conductor bars which are considerably spaced from each other, a number of other harmonic components are generated. In this respect, the squirrel-cage machine differs from the wound-rotor type machine.

FIGS. 10a and 10b show equivalent circuits of the induction machine shown in FIGS. 9a and 9b, respectively. Referring to FIGS. 10a and 10b, the induction machine is equivalent to the circuit which includes a pair of transformers having respective secondary windings connected to each other, wherein values of voltage (or current) and frequency of the primary main winding can be varied in correspondence to variation in the voltage applied to the primary exciting winding as well as frequency of the current flowing therethrough.

Referring to FIG. 10b and assuming that the current flowing through the primary main winding 22 has a frequency $f_{M1}$, the current flowing through the exciting winding 23 is of a frequency $f_{E1}$, the current flowing through the rotor bars is of a frequency $f_2$ and that the number of rotation is $N_R$, following relations apply valid:

$$f_2 = S_M f_{M1} = f_{M1} - \frac{N_R}{120} P_M \quad (21)$$

$$f_{E1} = f_2 - \frac{N_R}{120} P_E = f_{M1} - \frac{N_R}{120} (P_M + P_E) \quad (22)$$

where $P_M$: number of poles in the main winding, and $P_E$: number of poles in the exciting winding.

As will be seen from the expression (22), the frequency $f_{M1}$ of the current flowing through the main winding can be constantly maintained at a predetermined value by correspondingly controlling the frequency $f_{E1}$ of the current flowing through the exciting winding on the basis of the detected rotation number.

From the foregoing description, it will be appreciated that there has been provided according to an embodiment of the invention a variable speed rotary electric machine which can be implemented in a simplified brushless cage structure of increased rigidness and in which the frequency of the current flowing through one of the stator windings can be controlled by correspondingly controlling the frequency of the current flowing through the other stator winding in dependence on the revolving speed, whereby the drawbacks of the hitherto known machines described hereinbefore can be satisfactorily eliminated.

Although the description has been made on the assumption that the invention is applied to a variable speed generator system equipped with a prime mover such as a hydraulic turbine, it goes without saying that the invention may be equally applied to a variable speed motor system for driving a pump, fan or the like.

Figure 11:
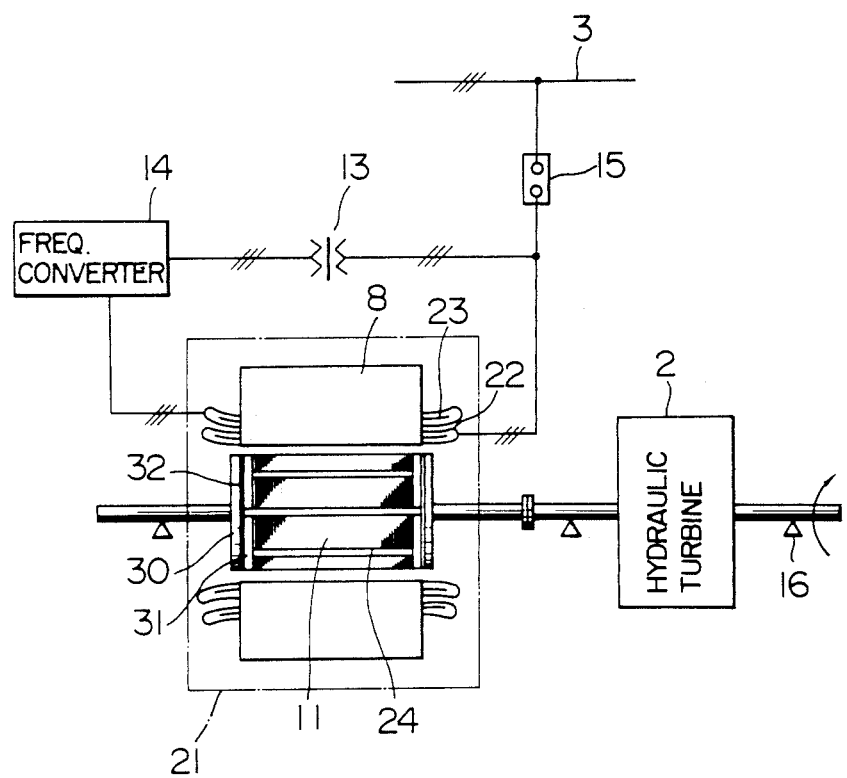
FIG. 11 is a schematic view showing a variable speed generator-motor system according to another embodiment of the invention.

FIG. 11 shows another embodiment of the present invention which differs from the preceding one in that double end rings are provided at each of both ends of the rotor. In the figure, numerals 30 and 31 denote the end rings, respectively, and 32 denoted an insulation for insulating the end rings 30 and 31 from each other. With this structure, improvement of the waveform can be accomplished by dividing each of the rotor bars into several strips while assuring the same function as that of the system shown in FIG. 3 without giving rise to a problem such as leakage between the adjacent bar strips because of insulation interposed between the adjacent end rings, whereby the aimed object can be attained in a relatively facilitated manner, to another advantage.

In the foregoing description, it has been assumed that the first stator winding is supplied with a current of commercial frequency. However, it is obvious that an AC current of other frequency or DC current may be alternatively supplied to the first stator winding.

There has now been provided according to the invention a variable speed rotary electric machine which comprises a stator composed of a stator core wound with first and second stator windings and a rotor of squirrelcage type, wherein the first stator winding is connected to an AC power supply of a predetermined fixed frequency while the second stator winding is connected to a power supply of variable frequency, and wherein the first and second stator windings are so wound as to form magnetic poles in different numbers, respectively, while the cage rotor is provided with a number of bars which form an intermediate number of magnetic poles between the numbers of poles formed by the first and second stator windings, respectively. With this structure, the magnetomotive force prevailing in the gap contains the magnetomotive components of controllable magnitude in correspondence to the magnetic poles formed by the first and second stator windings. By virtue of this feature, the cage rotor can be realized in a brushless structure, while the frequency of the current flowing through one of the stator windings can be controlled by correspondingly varying the frequency of the current flowing through the other stator winding in dependence on the revolving speed.

We claim:

1. A variable speed rotary electric machine, comprising a stator having first and second stator windings wound on a stator core and a cage rotor mounted rotatably within said stator and including a rotor core and rotor conductors constituting a cage rotor winding, wherein said first stator winding is connected to an AC power supply of a constant frequency while said second stator winding is connected to a power supply of variable frequency, said first and second stator windings being so wound as to form magnetic poles in numbers differing from each other, the rotor conductors of said cage rotor being electromagnetically coupled with magnetic fluxes generated by said first and second stator windings and so disposed as to form magnetic poles whose number is intermediate between the number of magnetic poles formed by said first stator winding and the number of magnetic poles formed by said second stator winding.

2. A variable speed rotary electric machine according to claim 1, wherein the number of the rotor conductors of said cage rotor is so selected as to correspond to an average of the numbers of poles formed by said first and second stator windings.

3. A variable speed rotary electric machine according to claim 1, wherein the rotor bars of said cage rotor are realized in a multiple cage structure, the rotor conductors constituting respective cages being electrically independent of one another.

4. A variable speed rotary electric machine, comprising a stator having first and second stator windings wound on a stator core and a cage rotor mounted rotatably within said stator and including a rotor core and rotor conductors constituting a cage rotor winding, wherein said first stator winding is connected to an AC power supply of a constant frequency and said second stator winding is connected to a power supply of variable frequency, said first and second stator windings being adapted for simultaneous energization by said constant frequency power supply and said variable frequency power supply, respectively, said first and second stator windings being so wound as to form magnetic poles in numbers differing from each other, the rotor conductors of said cage rotor being electromagnetically coupled with magnetic fluxes generated by said first and second stator windings and so disposed as to form magnetic poles whose number is intermediate between the number of magnetic poles formed by said first stator winding and the number of magnetic poles formed by said second stator winding.

5. A variable speed rotary electric machine according to claim 4, wherein the number of the rotor conductors of said cage rotor is so selected as to correspond to an average of the number of poles formed by said first and second stator windings.

6. A variable speed rotary electric machine according to claim 4, wherein the rotor bars of said cage rotor are realized in a multiple cage structure, the rotor conductors constituting respective cages being electrically independent of one another.

7. A variable speed rotary electric machine according to claim 4, wherein said stator having said first and second stator windings wound on said stator core is a non-rotatable member.

* * * * *